July 11, 1961 L. M. COTCHETT 2,991,514
TOP ROLLS FOR DRAWING FRAMES
Filed March 1, 1957
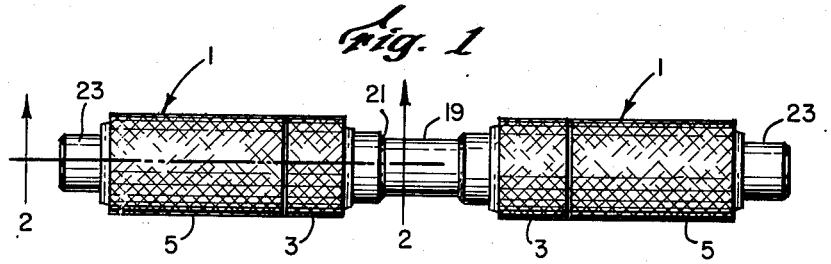
Fig. 1
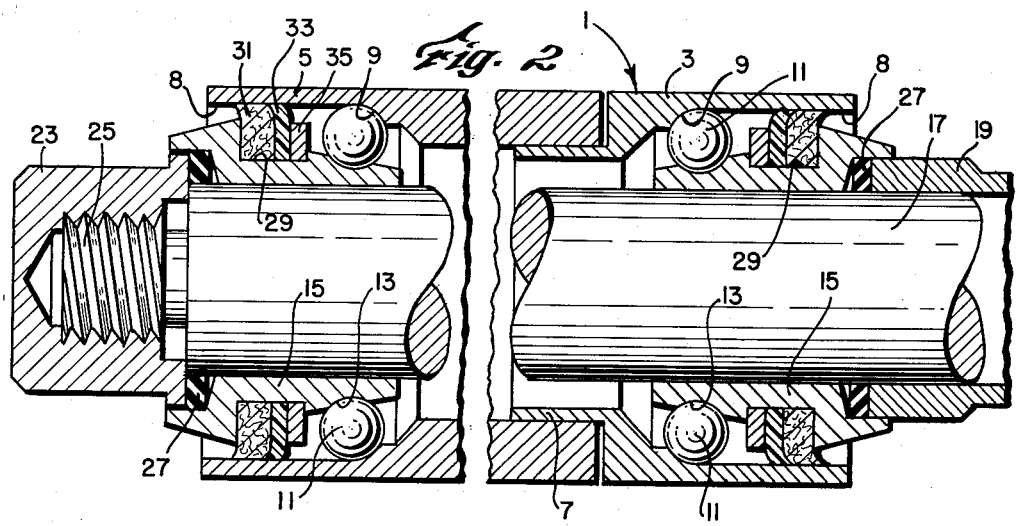
Fig. 2
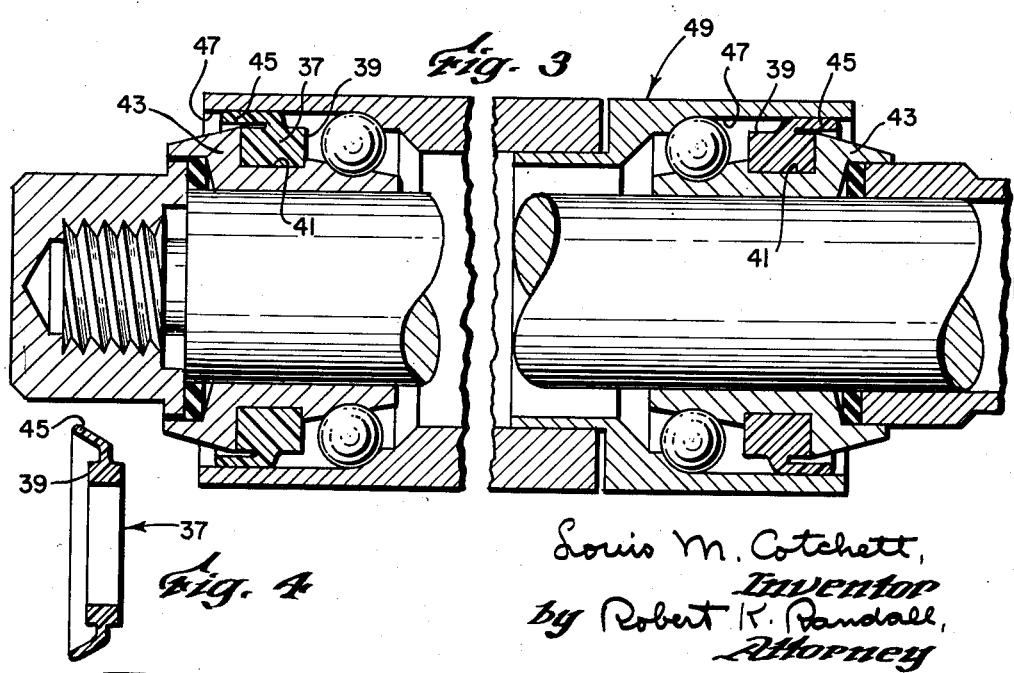
Fig. 3
Fig. 4
Louis M. Cotchett,
Inventor
by Robert K. Randall,
Attorney

2,991,514
TOP ROLLS FOR DRAWING FRAMES

Louis M. Cotchett, Whitman, Mass., assignor, by mesne assignments, to Machinecraft, Inc., Whitman, Mass., a corporation of Massachusetts
Filed Mar. 1, 1957, Ser. No. 643,377
3 Claims. (Cl. 19—142)

The present invention relates to top rolls for drawing frames and more particularly to shell type top rolls having anti-friction bearings, and is an improvement on the structure of my Patent No. 2,755,515, granted July 24, 1956. As therein, it has as its main object the provision of means for preventing access of lint and fly and other foreign matter to the bearings.

Some such means is essential to the proper working of shell type top rolls and especially those provided with ball bearings, else lint and fly will quickly accumulate at the bearings and cause the roll shells to rotate unevenly or to resist rotation to an extent causing uneven yarn and breakdown of the ends. The problem is complicated by the tendency of many prior types of lint seals to collect lint themselves to an extent checking or stopping the rotation of the roll shell, thus only shifting the seat of the trouble. Further, the cost of the lint seals and the trouble and expense of initial installation and subsequent replacement must be low, in order to make their use practicable. These and other factors have created a problem of such complexity that a simple commercially successful means of keeping foreign matter out of the ball bearings under the most severe conditions of linting, as with long staple cotton, is still being sought, and thus the recognized advantages of anti-friction type rolls have not been fully attained in practice.

Thus, the primary object of the invention is to devise a simple and inexpensive anti-friction shell type top roll with efficient, long-lasting lint seals.

A further object of the invention is to simplify the production of roll shells having accurately spaced and located bearing surfaces, without the need of machining the parts to micrometric tolerances.

To these ends, the felt or other fibrous washer of my above patent is supplemented or replaced by an annular synthetic plastic washer, preferably formed of nylon, mounted in a groove on the cone forming the stationary inner race member of the ball bearing as in such patent, and exceeding in its outside diameter the internal diameter of the portion of the roll shell surrounding it and thus in wiping contact with the rotating inside surface of the shell. The plastic washer is preferably continuous, and is either plane or preformed into cup shape and in either instance assumes or retains such cup shape with its concave surface facing away from the adjacent bearing which it protects. When used in conjunction with a felt washer, the latter likewise exceeds in outside diameter the diameter of the opposing internal surface of the roll shell, so that it too is cupped by engagement with the lesser internal diameter of the roll shell. In this combination, both washers are in certain instances held in the groove by a spring steel split washer snapped into the groove alongside the nylon washer. When the felt washer is dispensed with, the thickened collar within the preformed cupped nylon washer occupies the entire groove in the cone, being held therein by its resumption of its initial internal diameter after being slid over the cone to snap into the groove. These operations are quickly and easily performed by hand with or without the use of a hollow sleeve-like pushing implement. As is obvious, the parts of the lint seal are easily removed for renewal.

By making the roll shell in two parts one telescoping within the other, the proper spacing apart of the ball races formed therein is attainable with ease and accuracy by the extent to which the two parts are telescoped in press-fitting the one within the other.

Other objects of the invention, and the manner of their attainment, are as set forth hereinafter.

An illustrative embodiment of the invention is shown in the accompanying drawings, in which:

FIG. 1 shows the top roll in side elevation.

FIG. 2 is an axial section on line 2—2 of FIG. 1 on an enlarged scale.

FIG. 3 is an axial section corresponding to FIG. 2, showing an alternative form of lint seal.

FIG. 4 is a diametrical section of the lint seal of FIG. 3.

The top roll of FIGS. 1 and 2 comprises two roll shells 1 preferably of metal and having their exterior surfaces knurled or otherwise roughened to give secure adhesion of the usual cots (not shown) when cemented thereto. Each shell is made in two parts 3, 5, the shorter one 3 having a thin-walled portion 7 press-fitted within the thick-walled end of the other part 5. Each part is counterbored at one end, and a cup-shaped ball race 9 is formed in the inner end of each recess 8 thus formed, for the reception of the balls 11 running in a groove 13 in a sleeve or cone 15 slidably mounted on shaft 17 which maintains the roll shells in coaxial relation. A spacer 19 slidable on the shaft and holding the roll shells in properly spaced relation from each other has a reduced midsection, terminating in shoulders 21, which is engaged by the saddle or other weighting means (not shown). End caps 23 are internally threaded to screw onto the threaded reduced extremities 25 of shaft 17 and seat against the shoulder on the shaft 17. Resilient gaskets or washers 27, preferably of neoprene, are interposed between the recessed ends of the four cones 15 and the opposing surfaces of the end caps 23 and the spacer 19, to take up slack or play in the bearings, and hold the parts engaging the shaft against end-play and from rotation.

In accordance with the present invention, each cone is formed with a circumferential groove 29 having a high radial wall at its outward side and a low radial wall at its inward side, that nearest the balls 11. Against the high radial wall is fitted a flat felt or other resilient fibrous washer 31 larger than the interior diameter of the recess 8. Against the inward surface of this washer is placed a flat nylon washer 33 also exceeding in outside diameter the diameter of the counterbore 8. Against the inward surface of the nylon washer is fitted a flat split spring steel washer 35 having an outside diameter much less than that of the counterbore 8, the three washers combined filling the width of groove 29. The felt washer is held under axial compression by the nylon washer and the resilience of the split steel washer. Its rim is thus held in continuous wiping contact with the interior of the roll shell to form a complete and lasting seal against the entry of lint, dirt and other foreign matter, since it cannot expand axially with reduction of its radial extent. When each cone with its three washers in place is inserted within the recess 8, the felt washer 31 and nylon washer 33 are distorted into cup shape because their diameter is greater than that of the recess, the concaved surfaces of these two elements facing away from the ball bearings which they protect. The high outer wall of groove 29 supporting the felt washer nearly to the roll shell surface prevents it from slumping outwardly so as to lose contact with the interior of the shell, while the nylon washer supports the inward or convex face of the felt washer for the same purpose. The broad rim of the felt washer conforms precisely to the opposing surface of the recess, thus providing a sealing contact of substantial width in the axial direction of the roll. The nylon washer through its contact with the surface of the counterbore provides an additional seal or barrier against lint which supplements that provided mainly by the felt washer.

The three elements comprising the lint seal are installed on the cone with the utmost ease and rapidity when assembling the parts of the top roll. The three washers are merely placed on the small inward end of the cone one after the other and slide into groove 29 by manual pressure, either with the fingers alone or with a suitable tubular pushing instrument. Balls 11 are mounted in the usual cage (not shown), and snapped into place as a unit in groove 13 after the lint-sealing washers 31 and 33 have been installed on the cone. Replacement of worn or damaged felt and nylon washers is easily and quickly effected after disassembling the roll, by removing the cage and balls and then expanding the split washer 35 by a screw driver blade inserted in the split, after which it is slid off from the small end of the cone. The felt and nylon washers are pulled off with a pair of pliers, and new felt and nylon washers are installed and the split ring snapped back into place. The caged balls are then put back after cleaning and relubricating.

In the form of FIG. 3, the three washers described are replaced by a single molded nylon cupped washer 37, FIG. 4, having a collar or sleeve portion 39 filling the groove 41 in the cone 43 and having a concave flange or skirt 45 of mushroom pre-formed shape and of much greater diameter than the interior diameter of the counterbore 47 formed in each end of each roll shell 49. When the cone 43 with this cupped washer in place thereon with its concave side outward is inserted into the roll shell, the obliquely related outer surface of the skirt 45 is compressed into conformity with the interior surface of the roll shell and thus assumes the cylindrical shape shown in FIG. 3. This provides an area of wiping contact between the skirt 45 of the washer and the roll shell interior extending completely around the latter, and axially of the roll shell to a very substantial extent, thus barring the entry of lint and dirt. Since nylon is characterized by a low coefficient of friction and a strong tendency to resume its initial shape and resist taking a permanent set, this form of the invention possesses the advantage of a long useful life.

This lint seal 37 is installed as before described, by merely forcing it over the small end of the cone until it snaps into the groove 41. Replacement in case of wear or damage is even easier than in the form of FIG. 2, and is effected in obvious manner.

Referring to the two-part form of the roll shells, this simplifies greatly the mechanical problem of attaining precise spaced relation between the two ball races 9 of the roll shells when these parts are being made rapidly by automatic screw machinery in quantity production to attain the economies incident thereto. With the distance of the ball races 9 from the outer ends of the respective parts 3, 5 accurately established, the two parts 3, 5, are pressed together by a press which is set to establish the over-all length of the roll shell by the length of its working stroke in telescoping the two parts. The combined length of the outer surfaces of the two parts 3, 5, is purposely made less than the minimum over-all length of the roll shell, to this end.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof, but what I do claim is:

1. A top roll having in combination a shaft, roll shells, inner race members on the shaft, bearing balls between such inner race members and the shells, the said members being grooved circumferentially, concave felt washers in the grooves, and concave plastic washers also in the grooves and engaging the felt washers, the washers making wiping contact with the interior surfaces of the roll shells throughout the entire circuit of the periphery thereof.

2. A top roll having in combination a stationary shaft, roll shells having recesses in their ends, cones on the shaft within the recesses, bearing balls between the roll shells and the cones, at least one of the cones having a circumferential groove, a felt washer and a nylon washer within the groove each initialy exceeding the diameter of the recess and cupped by engagement with the surface of the recess, and a metal washer also in the groove and bearing against one of the other two washers therein.

3. A top roll for spinning and roving frames having in combination a roll shell having a cylindrical recess in its end, a shaft, a cone on the shaft, ball bearings between the cone and the surface of the recess, a nylon washer about the cone, and resilient means confined between a portion of the cone and the nylon washer and in wiping contact with the interior of the recess, both the nylon washer and the resilient means initially exceeding the diameter of the recess where they contact it, and being distorted into cup shape thereby.

References Cited in the file of this patent
UNITED STATES PATENTS

| | | |
|---|---|---|
| 2,003,934 | Hansel | June 4, 1935 |
| 2,310,607 | Batesole | Feb. 9, 1943 |
| 2,716,780 | Swanson | Sept. 6, 1955 |
| 2,743,119 | Covert et al. | Apr. 24, 1956 |
| 2,878,084 | Bermingham | Mar. 17, 1959 |

FOREIGN PATENTS

| | | |
|---|---|---|
| 454,536 | Italy | Jan. 24, 1950 |